March 3, 1970 W. HUFF 3,498,033
METHOD AND APPARATUS FOR HARVESTING SEA PLANTS
Filed Jan. 31, 1967 2 Sheets-Sheet 1
FIG___1
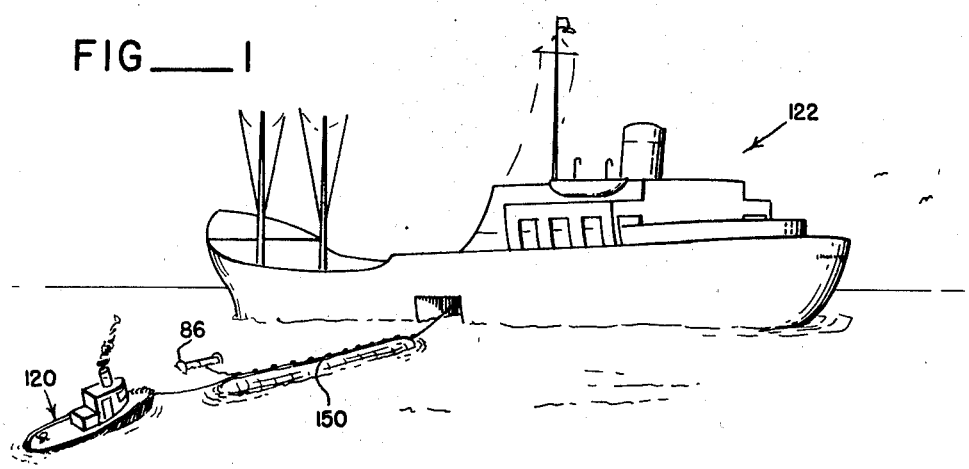
FIG___2
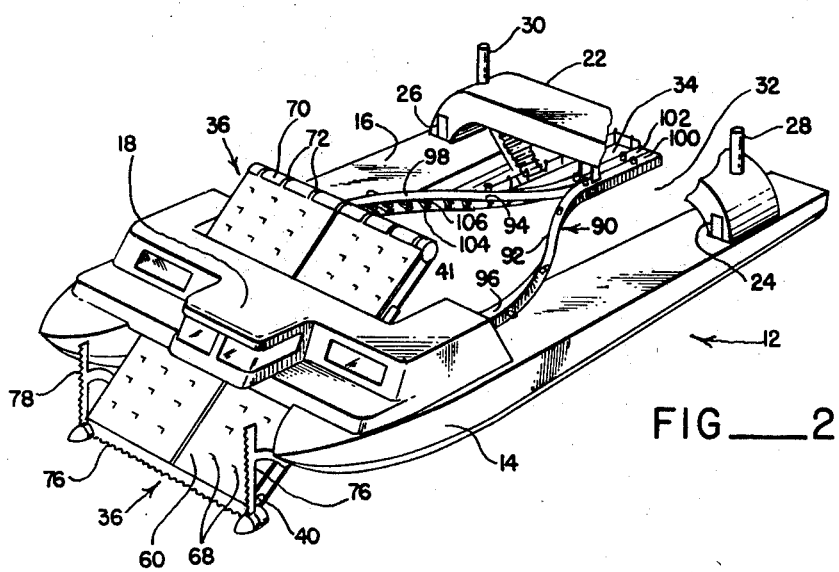
FIG___3
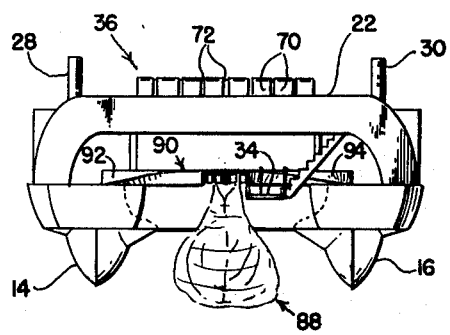
WALTER HUFF
INVENTOR.
BY
ATTORNEYS March 3, 1970 W. HUFF 3,498,033
METHOD AND APPARATUS FOR HARVESTING SEA PLANTS
Filed Jan. 31, 1967 2 Sheets-Sheet 2
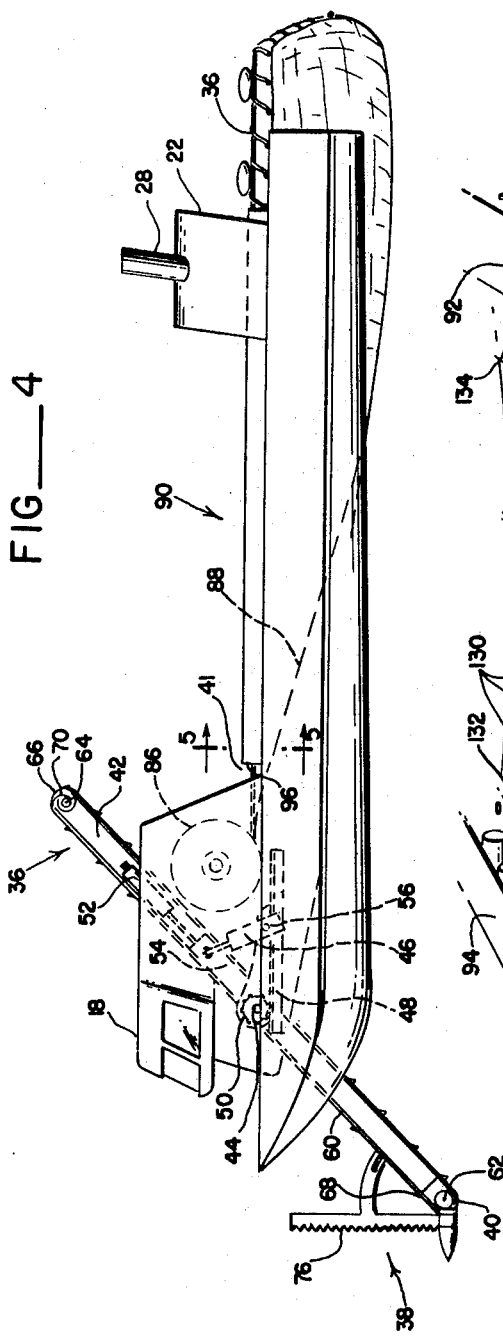
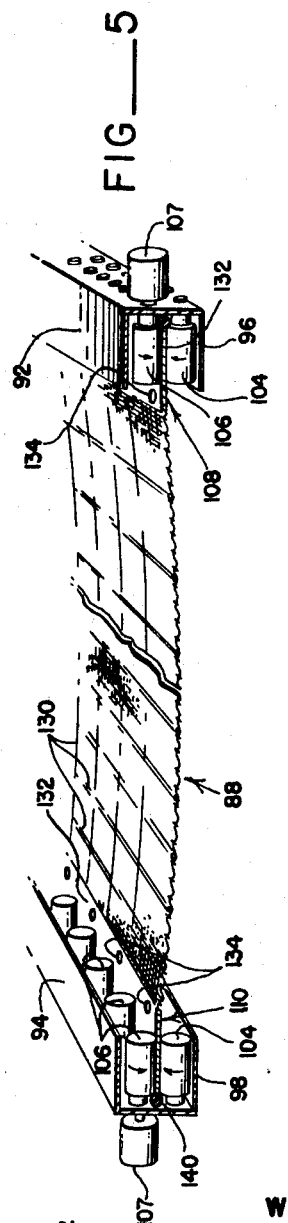
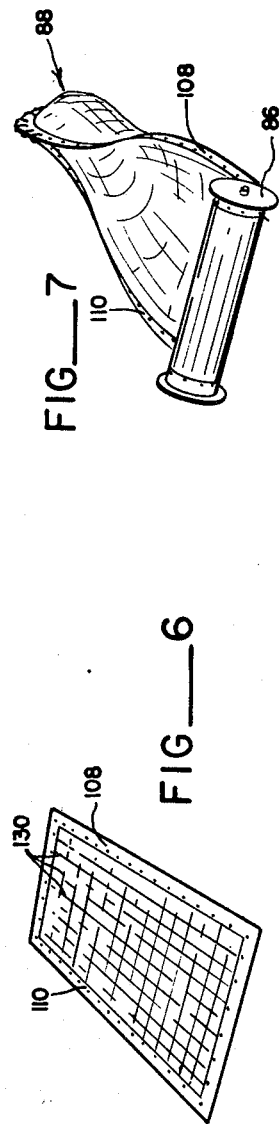
WALTER HUFF
INVENTOR.
BY Graybeal, Cole & Barnard
ATTORNEYS

United States Patent Office 3,498,033
Patented Mar. 3, 1970

1

3,498,033
METHOD AND APPARATUS FOR HARVESTING SEA PLANTS
Walter Huff, West Vancouver, British Columbia, Canada, assignor, by mesne assignments, to Sea-Chem Industries Ltd., Vancouver, British Columbia, Canada, a corporation of the Province of British Columbia
Filed Jan. 31, 1967, Ser. No. 612,858
Int. Cl. A01d 45/08; B65b 35/28, 43/00
U.S. Cl. 56—9   10 Claims

ABSTRACT OF THE DISCLOSURE

An improved harvesting vessel and method for cutting and bundling sea plants such as kelp. The vessel includes a cutting apparatus secured on an inclined endless belt type conveyor adjustably mounted on the forward end of the vessel, and a pair of guide rails equipped with drive rollers for propelling an elongated web beneath the discharge end of the conveyor and folding the web around the severed sea plant material deposited therein. The method comprises continuously cutting, collecting and bundling severed sea plant material on a sea-going vessel, and thereafter depositing the bundles into the sea and towing them to a processing factory.

BACKGROUND OF THE INVENTION

The present invention relates to improvements in the art of harvesting sea plants, such as kelp. More particularly, this invention provides an improved apparatus and method for harvesting such sea plants.

In co-pending U.S. application Ser. No. 517,385, filed Dec. 29, 1965 and incorporated by reference herein, a novel method and apparatus for harvesting sea plants such as kelp are disclosed. Briefly, the method and apparatus are characterized by an ocean-going vessel carrying an adjustable, inclined conveyor at its forward end and a hold or cargo space in the area aft of the conveyor. The bottom portion of the conveyor extends into the water and carries a sea plant cutting mechanism; the upper portion of the conveyor carries an assembly which grinds or comminutes sea plants severed by the cutting mechanism and discharges them into the hold of the vessel. The hold is provided with a movable bulkhead which travels fore and aft therein for selectively pushing ground plant material to the rear of the hold and periodically discharging the material into a factory ship or shoe installation with which the harvesting vessel will be associated.

The method and apparatus of the aforementioned copending application contribute to the sea plant harvesting art a highly automated, labor saving, efficient and practical manner of cutting, grinding, storing and delivering sea plant material to a processing factory. Unfortunately, however, the cost of such vessels is somewhat prohibitive, particularly to smaller harvesting companies. In the harvesting vessel and method of the aforementioned application, the harvesting vessel must return to the factory ship relatively often to deliver the cut and ground plant material before it dries out, and the hold of the vessel must be quite large and equipped with a system for keeping the material wet. This requires the harvesting vessel to be out of service during the time it travels between the cutting area and the factory ship and necessitates making the harvesting vessel larger, heavier, more complex, and hence expensive.

SUMMARY OF THE INVENTION

In view of the foregoing, it is an object of the present invention to provide an improved apparatus and method for harvesting sea plants, such as kelp, which are less expensive and more efficient than the prior art apparatuses and methods.

2

Another object of this invention is to provide a sea plant harvesting vessel and method characterized by the ability to store a relatively large quantity of cut sea plant material in a completely wet condition.

The foregoing objects have been realized by eliminating the hold structure from the sea harvesting vessel disclosed in the aforementioned application, and providing in its stead an arrangement for continuously passing an elongated flat web such as a net under the upper or discharge end of the conveyor where it receives severed sea plant material, continuously folding the web around the plant material and joining the lateral edges of the web to form an elongated bundle, and passing the bundle into the sea where it floats until picked up by a tug boat or towed to the factory ship by the harvesting vessel. Since the harvesting vessel need not store large quantities of plant material therein, it can be smaller and lighter, and hence less expensive. Moreover, the storing of the bundles of severed sea plant material in the sea not only prevents the material from drying out, but keeps it in its natural environment until it is delivered to a factory ship for processing. The grinder structure of the harvesting vessel disclosed in the aforementioned application has also been eliminated from the vessel of the present invention to save additional weight and expense. The grinding operation is carried out at the factory.

BRIEF DESCRIPTION OF THE DRAWINGS

The above and other objects, features and advantages of the invention reside in the details of construction and operation of the apparatus and in the steps of the process more fully described and claimed hereinafter. Reference will be had to the accompanying drawings, wherein like numerals will refer to like parts throughout, and in which:

FIGURE 1 is a perspective view showing a bundle of severed sea plant material, which has been cut and wrapped according to the teachings of the present invention, being towed by a tug boat to a factory ship for processing;

FIGURE 2 is a perspective view of a sea plant harvesting vessel constructed in accordance with the teachings of the present invention, with part of the aft bridge structure being broken away to more fully show the details of the rear end of the vessel;

FIGURE 3 is a rear elevation view of the vessel shown in FIGURE 2 in the process of bundling a load of severed sea plant material;

FIGURE 4 is a side elevation view of the vessel shown in FIGURES 2 and 3 in the process of bundling a load of severed sea plant material, and illustrating the manner in which the lateral edges of the web may be secured together;

FIGURE 5 is a partial sectional view, in perspective, taken generally along the line 5—5 of FIGURE 4, and showing the guide rail structure as the vessel illustrated in FIGURES 2-4 in the process of receiving a section of web to be folded around a load of severed sea plant material to be bundled;

FIGURE 6 is a perspective view of a generally elongated flat web which may be employed in conjunction with the guide rail structure of the vessel illustrated in FIGURES 2-4; and, FIGURE 7 is a perspective view placing the path of the web shown in FIGURE 6 as it is pulled from its spool and through the guide rail structure of the present invention.

DESCRIPTION OF A PREFERRED EMBODIMENT

Referring now to the drawings, a sea plant harvesting vessel 10, constructed in accordance with the teachings of the present invention, is best illustrated in FIGURES 2 to 4. Vessel 10 includes a hull structure 12, preferably of the catamaran type, having spaced apart hulls 14 and 16. Spanning the hulls 14, 16 at the forward end thereof is superstructure including a control bridge 18 containing various controls (not shown) for the harvesting equipment as well as the wheel house. A stern bridge structure 22 spans the rear ends of the hulls 14, 16 and includes intake vents and filters (not shown) for supplying air to the port and starboard engines, access hatches 24 and 26, and engine stacks 28 and 30. The spaced hulls 14, 16 rearwardly of the forward superstructure define an unobstructed or open area 32 for receiving nets and for permitting passage of bundles of severed sea plant material from between the hulls. Either one or two catwalks 34 extend over the open area 32 near the aft end of the hulls for permitting an operator to continuously lace or otherwise secure bundles of severed sea plant material as they are passed into the sea in a manner more fully described hereinafter.

An inclined, adjustably mounted conveyor 36 passes through the hull structure 12 directly aft of the control bridge 18 for collecting severed sea plant material from a cutting mechanism 38 mounted on the lower or receiving end 40 thereof and delivering it to a material receiving area 41 generally located in the approximate center of vessel 10. As best shown in FIGURE 4, conveyor 36 includes a frame 42 mounted for limited pivotal movement about a pivot or trunnion 44 by means of a hydraulic piston and cylinder arrangement 46 connected between the conveyor and the hull structure 12. Conveyor frame 42 is also mounted for limited fore and aft movement in a generally horizontal plane by means of a rack 48 secured to the hull structure 12 and a cooperating pinion gear 50 rotatably mounted on the pivot 44. A third mode of adjustment for the conveyor is provided by a hydraulic piston and cylinder arrangement 52 which selectively raises and lowers the frame along its angle of incline. The piston and cylinder arrangement 52 is mounted between the conveyor frame 42 and a guide and support member 54 which is fixed against up and down movement. The hydraulic piston and cylinder arrangement 46 is pivotally connected to the hull structure as at 56 to permit the fore and aft and raising and lowering movement of the frame 42. Suitable conventional power and drive means (not shown) are provided for operating the hydraulic piston and cylinder arrangements 46 and 52. The angle through which the conveyor may pivot and the distance which it may move fore and aft and up and down will depend upon the nature of the environment in which the vessel is operated.

The conveyor 36 further includes an endless belt 60 mounted around rollers 62 and 64 of the frame member 42 for conveying severed sea plant material from the cutting mechanism 38 to the upper or discharge end 66 of the conveyor. The belt 60 includes a plurality of spaced rows of cleats or lugs 68 thereon for engaging the severed sea plant material deposited thereon by the cutting mechanism 38. At the discharge end 66 of the conveyor 36 is a combing device 70 having slots 72 therein through which the lugs 68 pass as the endless belt 60 is rotated (see FIG. 2). Combing device 70 functions to strip the severed sea plant material from the lugs 68 at the discharge end of the conveyor, whereupon the severed sea plant material will drop into the material receiving area 41 which discharge end of the conveyor 36 overrides.

The sea plant cutting mechanism 38, best shown in FIGURES 2 and 4, includes a pair of spaced, generally vertical cutting bars 76 and 78 and a generally horizontal cutting bar 80 extending therebetween. The entire cutting mechanism 38 is adjustably pivotally connected to the lower or receiving end 40 of the conveyor 36 so that the vertical and horizontal cutting bars 76, 78 and 80 can be maintained in their substantially vertical and horizontal attitudes regardless of the angle of incline of the conveyor.

The vessel 10 is further provided with an arrangement for bundling the severed sea plant material discharged from the conveyor 36 and passing such bundles into the sea for storage. This arrangement includes a flat web or net material 88 rotatably mounted on a spool 86 detachably secured to the hull structures above and forward of material receiving area 41. A guide rail structure 90 is spaced rearwardly of spool 86 for pulling web 88 from the spool and continuously folding it around the severed sea plant material deposited in the web by discharge end 66 of conveyor 36.

Guide rail structure 90 includes a pair of generally channel-shaped guide rails 92 and 94 having spaced apart receiving ends 96 and 98 which extend generally into the material receiving area 41 of the vessel, and adjacent discharge ends 100 and 102 near the stern of the vessel. The channel-shaped rails each have a plurality of spaced pairs of cooperating rollers 104, 106, some or all of which are power driven as by conventional electric or hydraulic motors 107, for receiving, guiding and propelling lateral edges 108, 110 of web 88 past the material receiving area 41 and through the rails.

The rails 92 and 94 are spaced and face one another at their receiving ends 96 and 98 for receiving the web 88 in a generally flat condition (see FIG. 5). They then converge (FIG. 2) and twist approximately 90° to an adjacent, downwardly facing position at their discharge ends 100 and 102 to bring the lateral edges 108 and 110 of the web 88 into juxtaposition around the severed sea plant material which the conveyor 36 will deposit therein at the material receiving area 41 of the vessel. Thus, the guide rails will continuously fold flat web 88 into a generally cylindrical configuration around the severed sea plant material as the lateral edges of the web are passed therethrough (see FIG. 7). The lateral edges of the web are then laced or otherwise suitably secured to one another, either by a worker or automatic means (not shown), and discharged into the sea for storage until picked up by a tug boat 120 (FIG. 1) and towed to a factory ship 122 or shore-based (not shown) processing factory.

While any web suitable for containing the severed sea plant material may be employed, the web construction 88 (best shown in FIGS. 5-7) is a particularly useful one. The web includes a network of interlaced cable strands 130 crossing one another at approximately 90° angles and covered by a sheet of flexible material. The flexible material may be fabric or plastic, but should preferably be pervious or porous so that sea water may keep the severed sea plant material wet while the bundles are floating in the sea waiting to be delivered to the processing factory. The edges 108, 110 of the web are preferably reinforced by heavy net binding or plastic 132, for example, and provided with spaced holes 134 reinforced by eyelets or grommets for receiving the lacing 136 which is used to secure the lateral edges together around the load of severed sea plant material. As best shown in FIGURE 5, longitudinal cables 140 or other retaining means which border the reinforced lateral edges 108 and 110 of the web 88 prevent the edges from inadvertently sliding sideways out of the rolls 104 and 106 as the web is passing longitudinally through the guide rails.

In operation, while the vessel is traveling to and from the waters where the sea plant (such as kelp, for example) to be harvested is located, it is desirable to raise the conveyor 36 out of the water to eliminate its drag on the forward speed of the vessel 10. The conveyor may similarly be raised to provide easy access to the lower end of the conveyor for replacement and repair of the cutter mechanism and other structural elements.

When the vessel 10 reaches the waters where the sea plant to be cut is located, the hydraulic piston and cylinder arrangements 46 and 52 and the rack and pinion drive 48, 50 are operated to adjust the angle of incline, height and fore-aft position of the conveyor 36 in accordance with the environmental conditions. As the vessel 10 moves through the water the vertical and horizontal cutting bars 76, 78 and 80 will continuously sever the sea plants and the receiving end 40 of the conveyor 36 will catch the severed material and convey it over the discharge end 66. At the discharge end of the conveyor the combing mechanism 70 will strip the material from the lugs 68 and the severed sea plants will fall into the material receiving area 41 of the vessel. The web which is continuously being pulled from the spool 86 and propelled through the guide rails 92 and 94 by means of the drive rollers 104 and 106 will catch the severed sea plant material discharged from the conveyor 36 at the material receiving area 41. As the web 88 is propelled through the guide rails 92 and 94 it will be folded around the severed sea plant material and the lateral edges are brought into juxtaposition as the web is being discharged from the rear end 100 and 102 of the guide rails. At the rear end of the vessel 10 a worker may then string lace through the aligned holes 134 of the adjacent lateral edges 108 and 110 of the web to secure them together. Alternatively, of course, any other suitable means may be employed for securing the lateral edges of the web together. In addition, it is contemplated that automatic means may be used instead of a worker for securing the edges.

When a complete length of web 88 passes through the discharge end of the guide rail structure it is deposited into the sea. The bundle 150 (see FIG. 1) will float in the sea (its natural environment) and remain wet until it is picked up by a tug boat 120 and towed to a factory ship 122 for processing. The empty spool 186 may be tied to the floating bundle 150 to serve as a marker buoy. Since harvesting vessel 10 does not have to store the bundles 150, it may be made lighter and smaller. Moreover, since a tug boat may be employed to deliver the bundles to the processing ship 122, the harvesting vessel may remain in operation constantly instead of making time-consuming trips to and from the processing ship or shore-based plants.

The foregoing is merely descriptive of a preferred embodiment of the invention. Since numerous modifications and equivalents may be devised by those skilled in the art, it is not desired to limit the invention to the exact construction and operation and to the exact methods shown and described.

What is claimed is:
1. A sea plant harvesting vessel, comprising:
  (a) a hull including a forward end, a rear end and a material receiving area therebetween, said hull including an opening into the water and defining said material receiving area,
  (b) a sea plant cutting apparatus mounted on the forward end of said hull,
  (c) conveyor means connected to the forward end of said hull for conveying severed sea plant material from said sea plant cutting apparatus to said material receiving area of said hull; said conveyor means including a discharge end overlying said material receiving area of said hull;
  (d) means connected to said hull for passing a generally elongated flat web beneath said discharge end of said conveyor and into said opening and into said water for receiving severed sea plant material; and
  (e) folding and attaching means connected to said hull for folding and detachably securing the generally elongated flat web around severed sea plant material deposited therein to form a generally elongated bundle.

2. A sea plant harvesting vessel according to claim 1 wherein said conveyor means comprises an inclined, endless belt type conveyor adjustably connected to said forward end of said hull; said conveyor further including a receiving end spaced forwardly and downwardly of said discharge end thereof, and carrying a sea plant cutting apparatus on said receiving end; and further including means for varying the angle of incline of said conveyor relative to said hull, and means for raising and lowering said conveyor along its angle of incline relative to said hull.

3. A sea plant harvesting vessel according to claim 1 wherein said means for passing a generally elongated flat web beneath said discharge end of said conveyor comprises spool means connected to said hull adjacent the material receiving area thereof for rotatably supporting a roll of flat web material, and drive means for propelling the web through said material receiving area of said hull and through said folding and attaching means.

4. A sea plant harvesting vessel according to claim 3 and wherein said web comprises a network of interlaced flexible strand material and includes reinforced lateral edges adapted to be secured together.

5. A sea plant harvesting vessel according to claim 3, wherein said folding means comprises guide rail means having a web receiving end which extends into said material receiving area of said hull and a discharge end adjacent said rear end of said hull.

6. A sea plant harvesting vessel according to claim 5 wherein said guide rail means includes a pair of guide rails facing one another; said guide rails being spaced apart at said web receiving ends thereof and converging to a substantially adjacent position at said discharge ends thereof; and further including cooperating pairs of guide rollers connected to said guide rails for receiving the lateral edges of the flat web.

7. A sea plant harvesting vessel according to claim 6 wherein at least some of said guide rollers are power driven and constitute said drive means for propelling the web through the material receiving area of said hull and through said guide rails.

8. In a method of harvesting sea plants in a vessel having cutting and conveying means and including an opening in the hull into the water, the steps of:
  (a) severing sea plants by means of said cutting means and conveying them aboard said vessel,
  (b) depositing the sea plant material into a generally elongated flat web suspended in the vessel generally in said opening,
  (c) folding the web around the severed sea plant material as the web is loaded to bring the laterial edges thereof into juxtaposition and securing said edges together; and
  (d) floating at least a portion of said bundle while it is still in said opening.

9. A method of harvesting sea plants according to claim 8 and further including the steps of discharging said elongated bundle of severed sea plant material from said vessel and thereafter towing the bundle to a processing factory.

10. A method of harvesting sea plants according to claim 8 and wherein said loading, folding, edge securing, and floating of said bundle is generally continuous.

References Cited
UNITED STATES PATENTS

| | | | |
|---|---|---|---|
| 1,120,206 | 12/1914 | Knapp | 56—9 |
| 1,571,395 | 2/1926 | Clark | 56—9 |
| 2,334,256 | 11/1943 | Eaton | 53—9 X |
| 2,391,926 | 1/1946 | Scott | 114—26 X |
| 3,273,276 | 9/1966 | Englesson | 43—6.5 |
| 3,286,447 | 11/1966 | Grinwald | 56—9 |
| 3,347,029 | 10/1967 | Grinwald | 56—9 |

ANTONIO F. GUIDA, Primary Examiner

P. A. RAZZANO, Assistant Examiner

U.S. Cl. X.R.

56—1; 114—26; 53—29; 214—12